Nov. 18, 1941.    S. MENDELSOHN ET AL    2,263,046
SYNCHRONIZING APPARATUS
Filed Oct. 3, 1940    2 Sheets-Sheet 2
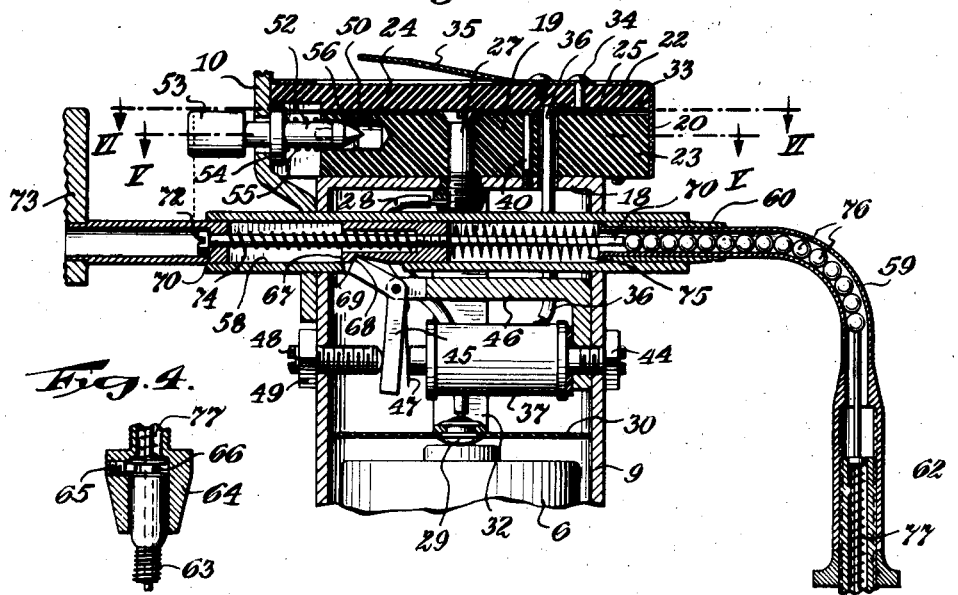
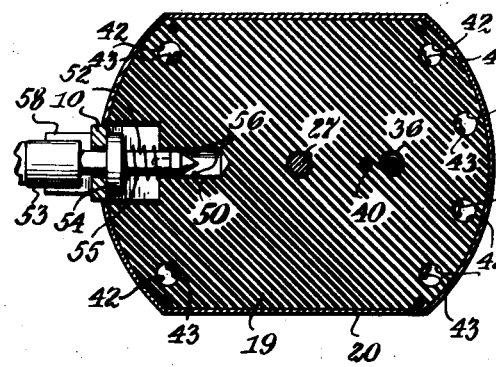
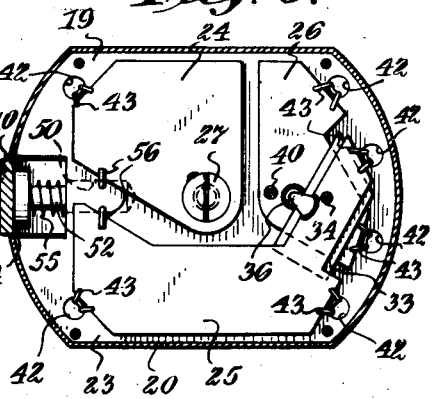
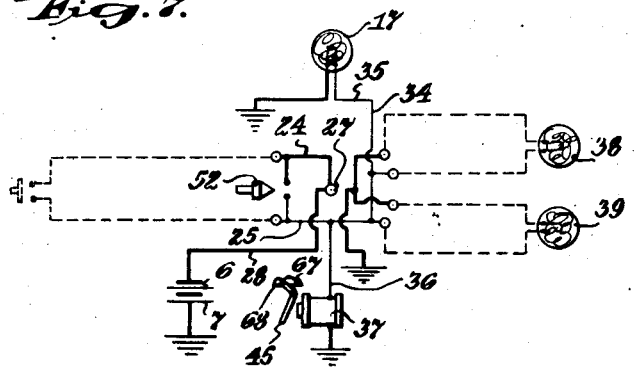
INVENTOR
S. MENDELSOHN
P. K. McGALL
BY
ATTORNEY Patented Nov. 18, 1941

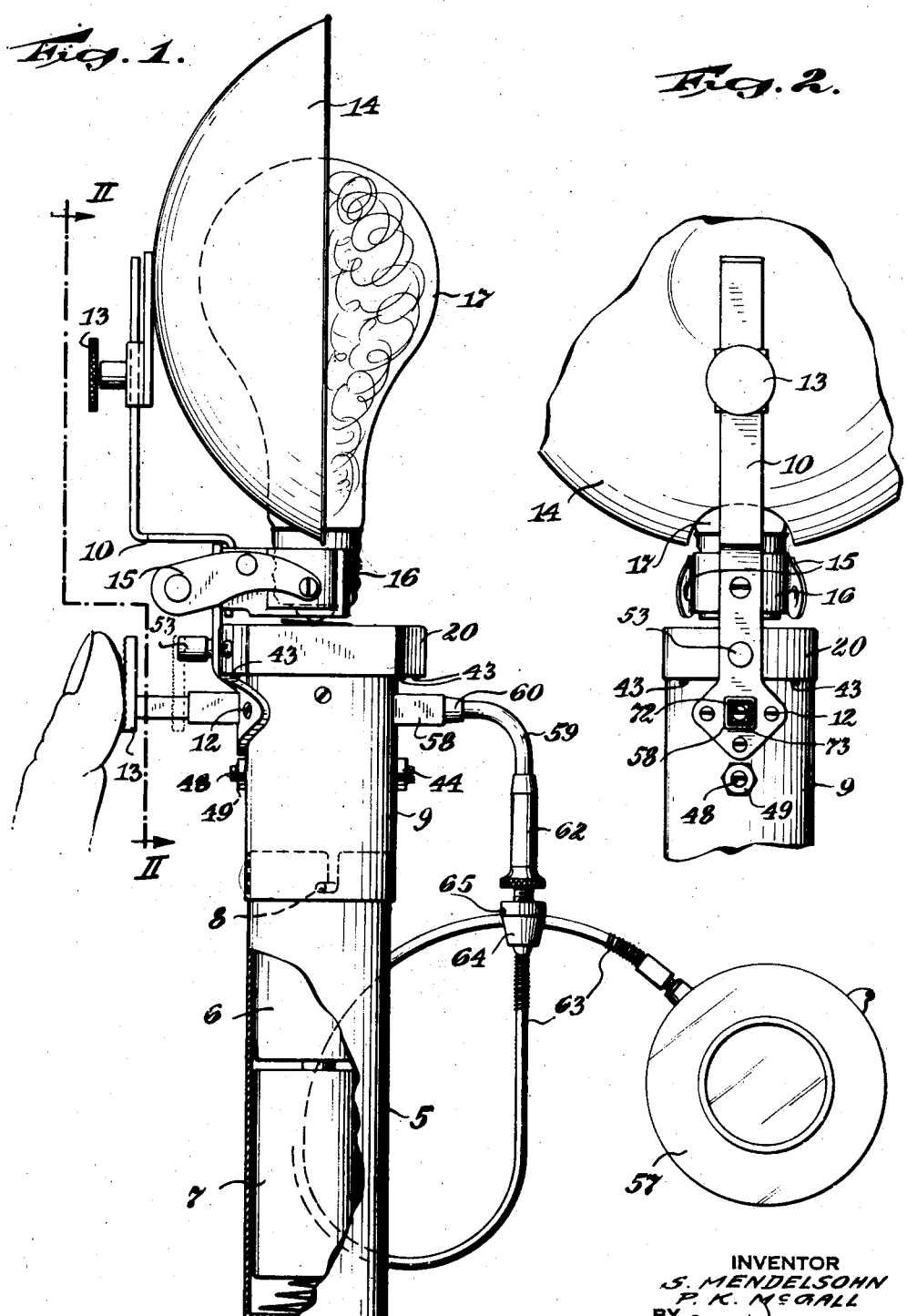

2,263,046

UNITED STATES PATENT OFFICE 2,263,046

SYNCHRONIZING APPARATUS

Samuel Mendelsohn, Montclair, and Philip K. McGall, Orange, N. J.; said McGall assignor to said Mendelsohn Application October 3, 1940, Serial No. 359,498

5 Claims. (Cl. 67—29)

The present invention relates to camera synchronizers for completely opening a camera shutter simultaneously with the moment of peak intensity from a photoflash lamp.

Apparatus of this type is now well known to the art but heretofore it has been more or less of a cumbersome nature, being composed of numerous parts which detracts appreciably from the flexibility of operation of the synchronizer and making the assembly somewhat unwieldy when affixed to a camera. In addition it has been impractical with prior structures to utilize the synchronizing apparatus detached from the camera and disposed remotely thereto owing to the rigidity of the connecting mechanism. Moreover, one of the most troublesome features heretofore existent has been the necessity for "cocking" the synchronizer prior to each exposure which all too frequently results in loss of the desired picture, particularly in the case of newspaper photography.

It is accordingly an object of the present invention to provide a synchronizer for camera shutters which is very compact and yet extremely flexible in operation.

Another object of the present invention is the provision of a camera synchronizer which is automatically "cocked" after each exposure preparatory to operation for a succeeding exposure.

Another object of the present invention is the provision of a camera synchronizer of compact form which is readily attachable to a battery case and which may be operated from a relatively remote position respecting the camera.

A further object of the present invention is the provision of a camera synchronizer of compact form which is readily attachable to a battery case wherein the entire apparatus is operable by depression of a single retractable mechanism and which automatically resets the apparatus for a succeeding camera exposure.

Still further objects of the present invention will become obvious to those skilled in the art by reference to the accompanying drawings wherein:

Fig. 1 is an elevational view of the camera synchronizer of the present invention, with parts broken away to better illustrate the apparatus;

Fig. 2 is a side elevational view taken on the line II—II of Fig. 1 and looking in the direction indicated by the arrows;

Fig. 3 is a sectional view on a slightly enlarged scale of the synchronizing apparatus as shown in Fig. 1;

Fig. 4 is a sectional view of the shutter-synchronizer coupling as shown in Fig. 1;

Fig. 5 is a sectional view taken on the line V—V of Fig. 3 looking in the direction shown by the arrows;

Fig. 6 is a sectional view taken on the line VI—VI of Fig. 3 looking in the direction indicated by the arrows;

Fig. 7 is a schematic diagram of the electrical circuit arrangement of the present synchronizer, and Fig. 8 is an elevational view of a contact terminal forming part of the synchronizing apparatus of the present invention.

Referring now to the drawings in detail the synchronizer of the present invention, as shown in Fig. 1, comprises a cylindrical metal casing 5 which houses a pair of dry cell batteries 6 and 7 for supplying sufficient energy to ignite a photoflash lamp and operate a relay to cause opening of a camera shutter. Supported by the casing 5, such as by a bayonet-clutch arrangement 8, is a cylindrical metallic base member 9.

A bracket 10 is rigidly secured to the member 9, such as by set screws or the like 12 (Fig. 2), and extends angularly upward and to which is adjustably secured, as by a knurled handled set screw 13, a metallic reflector 14. Also secured to the bracket 10 is a spring pressed clamping member 15 carrying at its free end opposite to the finger pieces a semi-circular metal collar 16 (Fig. 1) which forms a socket shell portion for a photoflash lamp 17.

As can be more readily appreciated from Fig. 3, the metallic base member 9 carries the entire synchronizing apparatus and when attached to the battery case 5 connection to the batteries 6 and 7 is readily established, as will be hereinafter more fully pointed out. Supported by the upper closed end 18 of the cylindrical member 9 is an insulating block or the like 19 surrounded by a metallic collar 20, the latter of which is finished to match the casing 5 and member 9. This insulating block, as shown, is formed in two pieces 22 and 23 with a plurality of metallic plates 24, 25 and 26 being held between the two pieces by the collar 20.

By reference more particularly to Fig. 6 it will be noted that these metallic pieces lie in the same plane and are all separated from each other to serve as electrical contact terminals. The metallic plate 24 is connected by a terminal screw 27 (Fig. 3) and conductor 28 to a terminal contact 29 carried by an insulated washer or the like 30, the latter of which is insulatingly supported by a bracket 32 so as to dispose the contact 29 over the terminal of battery 6 which thus supplies a positive polarity to the metallic plate 24.

The metallic plate 25, which normally carries no electrical current, overlaps the plate 26 but is insulated therefrom by a sheet of insulating material 33, as can be seen in Fig. 6, and this plate is connected by a rivet or the like 34 passing through the upper piece 22 of the block 19 to a spring strip 35 constituting the center contact of the socket for the photoflash lamp 17. In a similar manner the plate 26 is connected by a conductor 36 soldered thereto which extends to one end of the winding of a solenoid 37, the opposite end of which is grounded as can be seen in Fig. 7.

The sole purpose of the metallic plate 26 is to supply negative polarity to still further photoflash lamps as shown by the lamps 38 and 39 in Fig. 7 and in order to ground the plate 26 so that it is connected through ground to the negative side of the batteries 6 and 7 a set screw 40 projects through the lower piece 23 of the insulating block 19 into the closed metallic end 18 of the member 9. For the purpose of establishing connection with the plate 26 as well as the plates 24 and 25 the underside of the block 19 is provided with a plurality of openings 42. Soldered to the respective plates 24, 25 and 26 are spring clips 43, such as shown in Fig. 8, which project downwardly through the openings 42 thus enabling a connecting jack to be readily inserted into contact with the spring clips 43.

The solenoid 37 is bolted, as at 44, to the cylindrical member 9 to allow for adjustment of the core and an armature 45 in the form of a bell-crank is pivoted to a metallic bracket 46 forming a part of the magnet of the solenoid with the armature being biased in a normally open position by a leaf spring 47. An adjusting screw 48 and locknut 49 are provided to enable adjustment of the air gap of the armature and tensioning of the spring 47 for the purpose of synchronizing the apparatus as hereinafter explained.

To complete a circuit to the photoflash lamp 17 (or the lamps 38 and 39 if connected by jacks to the plates 25 and 26 as shown in Fig. 7) the block 19 is provided with a recess 50 which is slidably engaged by a switch in the form of a tapered pin 52. As will be seen from Figs. 3, 5 and 6, the switch extends through an opening provided in the bracket 16 and carries a head 53 on one side of the bracket and a collar 54 on the other side, with a coil spring 55 bearing against the collar 54 and the block 19, to maintain the switch in its normal open position.

When the switch 52 is depressed the tapered end contacts a pair of contact terminals 56 (Fig. 6) secured to the respective metallic plates 24 and 25. Since the plate 24, as previously mentioned, carries a positive polarity from the batteries 6 and 7, the switch 52 thus bridges this plate 24 with the plate 25 making the latter also momentarily positive. The photoflash lamp 17 being connected to the plate 25 by the rivet 34 and spring clip 35 (as well as the lamps 38 and 39 by the clips 43) and the winding of the solenoid 37 being connected by the conductor 36 to the plate 26, are thus simultaneously energized, since the lamp 17 (and lamps 38 and 39) as well as the solenoid 37, receive negative polarity through the ground or metallic parts of the apparatus.

In order to cause opening of a camera shutter 57 (Fig. 1), the metallic member 9 is provided with a tubular casing 58 extending transversely therethrough and projecting slightly beyond the walls of the cylindrical member 9. A flexible metallic sheathing or the like 59 is secured by a sleeve or the like 60 to one of the projecting ends of the tubular casing 58 allowing rotary motion therebetween, and the free end of the sheathing is provided with threaded sleeve 62 which connects to the camera shutter cable release 63, through the medium of a connector 64 as shown in Fig. 4. Rotary motion is also provided between the cable release 63 and the connector 64 through the medium of a set screw 65 projecting into an annular slot 66 which thus retains the parts in operative relation while permitting rotary motion therebetween.

This latter rotary motion together with that beween the flexible sheathing 59 and sleeve 60, and the flexibility of the sheathing itself makes a substantially universal joint between the synchronizing apparatus and the camera allowing the apparatus to be held in practically any desired position relative to the camera during an exposure.

Interiorly of the casing 58 is a slidable sleeve or plunger 67 provided with a notch 68 normally engageable by one arm of the solenoid armature 45 which projects through a slot 69 in the wall of the casing 58. Threadedly attached to the sleeve or plunger 67 is a rod 70 projecting each side of the plunger which at one end is provided with a head 72 for telescopically retaining a finger piece 73 within the casing 58 in position to operate the plunger. A coil spring 74 surrounds the rod 70 and is disposed between the end of the finger piece 73 and the plunger sleeve 67 which is compressed upon depression of the finger piece. A similar coil spring 75 likewise surrounds the rod 70 and is disposed between the plunger sleeve 67 and the interior end of the sleeve 60 which is compressed upon movement of the plunger sleeve and serves to return the plunger to its normal "cocked" position following each exposure.

To complete an operative connection from the plunger rod 70 to the cable release 63 and not detract from the flexibility of the sheathing 59, the latter is provided with a plurality of granules or balls 76 extending from the end of the plunger rod 70 to the end of the cable release wire. It will also be noted that the latter is surrounded by a coil spring 77 within the threaded sleeve 62 which serves to assist in closure of the camera shutter in the usual manner.

The normal position of the apparatus is as shown in Fig. 3 and when the synchronizer is connected to the camera shutter 57 in the manner illustrated in Fig. 1 it is ready for the taking of a photoflash exposure. The photographer accordingly depresses the finger piece 73 which thus telescopes within the protruding end of the casing 58 compressing the spring 74 until the finger piece contacts the head 53 of the switch 52.

Upon engagement of this finger piece with the switch, the latter is depressed simultaneously with further depression of the finger piece until the switch closes the contacts 56 (Fig. 6) which thus supplies electrical energy from the batteries 6 and 7 to the lamp 17 and solenoid 37 energizing both in the manner previously described. Energization of the solenoid 37 will cause the armature 45 to be retracted against the tension of the leaf spring 47 and cause disengagement of the armature from the notch 68. The potential energy now stored in the spring 74 upon depression of the finger piece 73 will cause rapid movement of the plunger 67 together with its integral rod 70 to the right as viewed from Fig. 3. Since one end of the rod 70 is engaged with one of the balls 76 the latter are likewise pushed or rolled to the right which in turn pushes on the cable release thus causing opening of the camera shutter 57.

Following the taking of the exposure and the removal of the operator's finger from the finger piece 73 the synchronizing apparatus and camera are again automatically "cocked" preparatory to a further exposure. Since movement of the cable release compresses the spring 77 carried by the sleeve 62 its expansion again closes the camera shutter immediately. In addition the coil spring 75 is likewise compressed upon movement of the plunger 67 under the influence of the compressed spring 74, with the result that the plunger 67 is immediately moved to the left, as viewed from Fig. 3, which pushes with it the finger piece 73 and now expanded spring 70 until the armature 45 again snaps into the notch 68 of the plunger 67 due to the energy in the leaf spring 47.

It will be noted that there is thus a slight time delay between energization of the solenoid 37 and the actual complete opening of the camera shutter which is timed so as to occur simultaneously with the moment of peak intensity of the photoflash lamp. Since the rod 70 threadedly engages the plunger 67 the tension of the spring 74 can be adjusted by rotation of the head 72 which thus effects to an appreciable extent the rapidity with which the camera shutter can be opened. To properly synchronize the apparatus, however, the air-gap of the solenoid armature is adjusted by means of the set screw 48 which is locked in place, once the adjustment is made, by the locknut 49. If further adjustment is required the core of the solenoid 37 can also be shifted through the medium of the locknut 44. Once the apparatus is adjusted, which is customarily done at the factory, it need not be further disturbed unless through shocks or jars such adjustment is shifted. In this manner the time required for the camera shutter to completely open can be made to coincide with the moment of peak intensity thus giving complete synchronization.

It thus becomes readily apparent to those skillled in the art that a synchronizing apparatus is herein provided which is very compact and which is readily attachable to the battery case. Moreover the connection of the synchronizer to the camera shutter is such that a substantially universal joint is established therebetween enabling operation of the synchronizer from practically any position relative to the camera. By the provision of an automatic self "cocking" arrangement which is of compact form and operable by a single control button the synchronizer is always ready for operation for a succeeding exposure thus saving considerable time which is so invaluable particularly in news-photography.

Although one embodiment of the present invention has been herein shown and described it is to be understood that still further modifications of the same may be made without departing from the spirit and scope of the appended claims.

What is claimed is:

1. A synchronizing apparatus for opening a camera shutter simultaneously with the moment of peak intensity from a photoflash lamp comprising a casing forming an end closure for a battery case, means carried by said casing for opening a camera shutter, electrically operable means within said casing normally engaging said shutter opening means for holding the latter against movement ready for operation, switching means carried by said casing and operable to cause the simultaneous energization of said photoflash lamp and said electrically operable means, potential energy storage means engageable with said shutter opening means for causing movement of the latter upon release thereof by said electrically operable means, a manually operable member for causing the storage of energy in said energy storage means and movable farther to operate said switching means with simultaneous energization of said photoflash lamp and electrically operable means to cause the latter to release said shutter opening means whereby the same is moved by the energy stored in said energy storage means to open the camera shutter at the moment of peak intensity of said photoflash lamp, and means operable upon movement of said shutter opening means in the shutter opening position for returning the same into engagement with said electrically operable means.

2. A synchronizing apparatus for opening a camera shutter simultaneously with the moment of peak intensity from a photoflash lamp comprising a battery case, a synchronizing unit readily attachable to said battery case including a socket for supporting a photoflash lamp and forming an end closure for said battery case, shutter opening means carried by said unit, electrically operable means forming a part of said unit and normally engaging said shutter opening means for holding the latter against movement ready for operation, switching means carried by said unit and operable to cause the simultaneous energization of said photoflash lamp and said electrically operable means, potential energy storage means carried by said unit for causing movement of said shutter opening means upon release thereof by said electrically operable means, a manually operable member forming a part of said unit for causing the storage of energy in said potential energy storage means and movable farther to operate said switching means to cause release of said shutter opening means and movement of the latter by said energy storage means to open the camera shutter at the moment of peak intensity of said photoflash lamp, and means carried by said unit and operable upon movement of said shutter opening means to the shutter opening position for returning the same into engagement with said electrically operable means.

3. A synchronizing apparatus for opening a camera shutter simultaneously with the moment of peak intensity from a photoflash lamp comprising a casing forming an end closure for a battery case, a shutter actuating member within said casing, a solenoid within said casing provided with an armature arranged to constitute a trigger for normally holding said shutter actuating member against movement ready for operation, a switch depressible to close an electrical circuit to said photoflash lamp and to said solenoid, means for storing potential energy engaging said shutter actuating member for causing movement of the latter, a manually operable member for causing the storage of potential energy in said means and movable farther into contact with said switch to depress the same and simultaneously cause ignition of said photoflash lamp and energization of said solenoid with attendant release of said trigger and accompanying movement of said shutter actuating member under the influence of the potential energy stored in said means to open the camera shutter at the moment of peak intensity of the photoflash lamp, and potential energy storage means operable upon movement of said shutter actuating member in the shutter opening position for returning said member into latching engagement with said trigger.

4. A synchronizing apparatus for opening a camera shutter simultaneously with the moment of peak intensity from a photoflash lamp comprising a battery case, a synchronizing unit readily attachable to said battery case including a socket for supporting a photoflash lamp and forming an end closure for said battery case, a movable plunger carried by said unit and adapted to be connected to a camera shutter for opening the same, a solenoid within said unit provided with an armature arranged to constitute a trigger for normally holding said plunger to prevent movement of the latter, a switch forming a part of said unit and depressible to close an electrical circuit to said photoflash lamp and to said solenoid, a coil spring in operative relation with said plunger for moving the latter upon the storage of potential energy in said spring, a manually operable member depressible to cause the storage of potential energy in said coil spring and movable farther into contact with said switch to simultaneously cause ignition of said photoflash lamp and energization of said solenoid with release of said trigger and accompanying movement of said plunger under the influence of the energy stored in said coil spring to open the camera shutter at the moment of peak intensity of the photoflash lamp, and a spring operable to store potential energy upon movement of said plunger in the shutter opening position for returning said plunger into latching engagement with said trigger.

5. A synchronizing apparatus for opening a camera shutter simultaneously with the moment of peak intensity from a photoflash lamp comprising a battery case, a synchronizing unit readily attachable to said battery case including a socket for supporting a photoflash lamp and forming an end closure for said battery case, a movable plunger carried by said unit, means connecting said plunger to a camera shutter including a plurality of granules cooperating to form a substantially universal joint therebetween, a solenoid within said unit provided with an armature arranged to constitute a trigger for normally holding said plunger to prevent movement of the latter, a switch carried by said unit and depressible to close an electrical circuit to said photoflash lamp and to said solenoid, a coil spring in operative relation with said plunger for moving the latter and said connecting means upon the storage of potential energy in said spring, a manually operable member depressible to cause the storage of potential energy in said coil spring and movable farther into contact with said switch to simultaneously cause ignition of said photoflash lamp and energization of said solenoid with release of said trigger and accompanying movement of said plunger and said connecting means under the influence of the energy stored in said coil spring to open the camera shutter at the moment of peak intensity of the photoflash lamp, and a spring operable to store potential energy upon movement of said plunger and said connecting means in the shutter opening position for returning said plunger into latching engagement with said trigger.

SAMUEL MENDELSOHN.
PHILIP K. McGALL.